(12) United States Patent
Meng et al.

(10) Patent No.: US 11,941,363 B2
(45) Date of Patent: Mar. 26, 2024

(54) INFORMATION PROCESSING METHOD AND APPARATUS, AND STORAGE MEDIUM

(71) Applicant: TENCENT TECHNOLOGY (SHENZHEN) COMPANY LTD, Guangdong (CN)

(72) Inventors: Fan Dong Meng, Shenzhen (CN); Yun Long Liang, Shenzhen (CN); Jin Chao Zhang, Shenzhen (CN); Jie Zhou, Shenzhen (CN); Jin An Xu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 466 days.

(21) Appl. No.: 17/341,614

(22) Filed: Jun. 8, 2021

(65) Prior Publication Data
US 2021/0312135 A1 Oct. 7, 2021

Related U.S. Application Data

(63) Continuation of application No. PCT/CN2020/091733, filed on May 22, 2020.

(30) Foreign Application Priority Data

May 28, 2019 (CN) .......................... 201910452828.3

(51) Int. Cl.
*G06F 40/30* (2020.01)
*G06N 3/02* (2006.01)

(52) U.S. Cl.
CPC .............. *G06F 40/30* (2020.01); *G06N 3/02* (2013.01)

(58) Field of Classification Search
None
See application file for complete search history.

(56) References Cited

U.S. PATENT DOCUMENTS

| 9,633,007 B1 | 4/2017 | Brun et al. |
| 2018/0032508 A1 | 2/2018 | Matskevich et al. |
| (Continued) | | |

FOREIGN PATENT DOCUMENTS

| CN | 106502989 A | 3/2017 |
| CN | 107526831 A | 12/2017 |
| (Continued) | | |

OTHER PUBLICATIONS

International Search Report for PCT/CN2020/091733 dated Aug. 25, 2020.
(Continued)

*Primary Examiner* — Stella L. Woo
(74) *Attorney, Agent, or Firm* — Sughrue Mion, PLLC

(57) ABSTRACT

Embodiments of the disclosure provide an information processing method, an information processing apparatus, and a storage medium. The method includes: obtaining source data; encoding sub-data in the source data based on a target word feature vector to obtain hidden feature vectors corresponding to the sub-data, the target word feature vector representing a sentiment feature standard; obtaining a word feature vector corresponding to the source data based on the hidden feature vectors corresponding to the sub-data; and inputting the word feature vector into a preset sentiment classification network to obtain a result of sentiment polarity prediction of the source data. According to the embodiments of the disclosure, the accuracy of sentiment polarity prediction may be improved.

20 Claims, 8 Drawing Sheets

(56) References Cited

U.S. PATENT DOCUMENTS

| | | | | |
|---|---|---|---|---|
| 2018/0129937 A1* | 5/2018 | Bradbury | ............... | G06N 3/045 |
| 2020/0073937 A1* | 3/2020 | Zhao | ........................ | G06F 40/30 |
| 2020/0167419 A1* | 5/2020 | He | ........................ | G06N 3/045 |
| 2020/0265192 A1* | 8/2020 | Lin | ........................ | G06N 3/044 |

FOREIGN PATENT DOCUMENTS

| | | |
|---|---|---|
| CN | 108170681 A | 6/2018 |
| CN | 109766557 A | 5/2019 |
| CN | 110210024 A | 9/2019 |

OTHER PUBLICATIONS

Written Opinion for PCT/CN2020/091733 dated Aug. 25, 2020.
Xin Li et al., "Transformation Networks for Target-Oriented Sentiment Classification," May 3, 2018, arXiv: https://arxiv.org/pdf/1805.01086.pdf (11 pages total).

\* cited by examiner

INFORMATION PROCESSING METHOD AND APPARATUS, AND STORAGE MEDIUM

CROSS-REFERENCE TO RELATED APPLICATION(S)

This application is a bypass continuation application of International Application No. PCT/CN2020/091733, filed on May 22, 2020, which claims priority to Chinese Patent Application No. 201910452828.3, entitled "INFORMATION PROCESSING METHOD AND APPARATUS, AND STORAGE MEDIUM" and filed on May 28, 2019 with the China National Intellectual Property Administration, the disclosures of which are herein incorporated by reference in their entireties.

FIELD

The disclosure relates to information processing technologies of computer applications, and in particular, to an information processing method and apparatus, and a storage medium.

BACKGROUND

Neural network model architecture has now become the standard for sentiment polarity analysis. Current mainstream sentiment polarity analysis models are based on convolutional neural networks (CNNs) or attention mechanisms.

At present, when a deep CNN network architecture is used for handling fine-grained sentiment analysis work, local features of a window section are extracted for data to be analyzed, data encoding is guided according to the local features and preset aspect features, non-linear or linear conversion is performed based on a data encoding result, the maximum feature in the converted feature result is determined, and sentiment polarity prediction is performed based on the maximum feature.

However, in a process of performing sentiment analysis on the data by using the foregoing method, the feature extraction of the deep CNN network always involves the local features of a window section, thus content sentiment analysis of the local features is omitted. As a result, when the local features and the preset aspect features are used for data encoding, the result of sentiment polarities represented by the data encoding result is inaccurate, which leads to inaccurate sentiment polarity prediction.

SUMMARY

Embodiments of the disclosure provide an information processing method, an information processing apparatus, and a storage medium, to improve the accuracy of sentiment polarity prediction.

The technical solutions in the embodiments of the disclosure are implemented as follows:

An embodiment of the disclosure provides an information processing method, including:
  obtaining source data;
  encoding sub-data in the source data based on a target word feature vector to obtain hidden feature vectors corresponding to the sub-data, the target word feature vector representing a sentiment feature standard;
  obtaining a word feature vector corresponding to the source data based on the hidden feature vectors corresponding to the sub-data; and
  inputting the word feature vector into a preset sentiment classification network for prediction to obtain a result of sentiment polarity prediction of the source data.

An embodiment of the disclosure further provides an information processing apparatus, including:
  a data acquisition unit configured to obtain source data;
  an encoding unit configured to encode sub-data in the source data based on a target word feature vector to obtain hidden feature vectors corresponding to the sub-data, the target word feature vector representing a sentiment feature standard;
  a pooling unit configured to obtain a word feature vector corresponding to the source data based on the hidden feature vectors corresponding to the sub-data; and
  a prediction unit configured to input the word feature vector into a preset sentiment classification network for prediction to obtain a result of sentiment polarity prediction of the source data.

An embodiment of the disclosure further provides an information processing apparatus, including:
  a memory, configured to store executable instructions; and
  a processor, configured to implement the information processing method provided in the embodiments of the disclosure when executing the executable instructions stored in the memory.

An embodiment of the disclosure provides a non-transitory computer-readable storage medium, storing executable instructions used for implementing the information processing method provided in the embodiments of the disclosure during execution by a processor being caused.

BRIEF DESCRIPTION OF THE DRAWINGS

To describe the technical solutions of example embodiments of the disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts.

DETAILED DESCRIPTION

To make the objectives, technical solutions, and advantages of the disclosure clearer, the following describes the disclosure in further detail with reference to the accompanying drawings. The described embodiments are not to be considered as a limitation to the disclosure. All other embodiments obtained by a person of ordinary skill in the art without creative efforts shall fall within the protection scope of the disclosure.

In the following description, the term "some embodiments" describes subsets of all possible embodiments, but it would be understood that "some embodiments" may be the same subset or different subsets of all the possible embodiments, and may be combined with each other without conflict.

In the following description, the terms "first", "second", and "third" are merely intended to distinguish between similar objects rather than describe specific orders. It would be understood that, "first", "second", and "third" are interchangeable in particular order or in sequence when allowed, so that the embodiments of the disclosure described here may be implemented in an order other than illustrated or described here.

Unless otherwise defined, meanings of all technical and scientific terms used in this specification are the same as those usually understood by a person skilled in the art to which the disclosure belongs. The terms used in the disclosure are merely used for describing embodiments, and are not intended to limit the disclosure.

Figure 1:
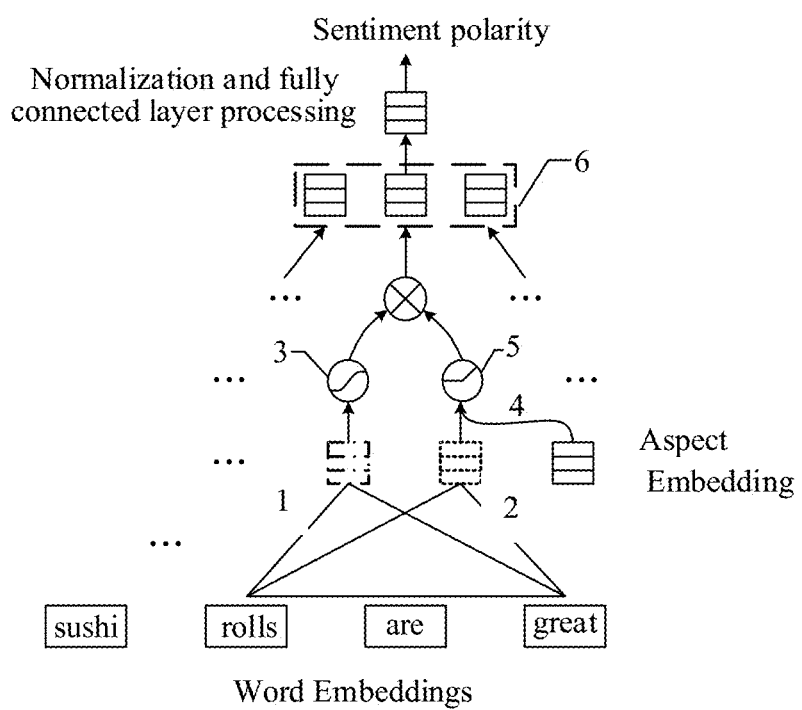
FIG. 1 is a diagram of a network architecture based on a convolutional neural network (CNN) according to an example embodiment of the disclosure.

As shown in FIG. 1, a deep convolutional neural network (CNN) architecture is used for handling fine-grained sentiment analysis work, and local signs of a window section of Word Embeddings (e.g., text "sushi rolls are great") are extracted. For the same local features extracted in different batches, some local features 1 are directly subjected to linear transformation 3, and the remaining local features 2 and a target feature vector, i.e., Aspect Embedding, are added together and subjected to linear transformation 4, and then subjected to non-linear transformation 5 together with features obtained by transforming the local features 1, to obtain an encoding feature of one local feature. After the encoding features of each local feature segment of Word Embeddings are screened 6, sentiment classification prediction is then performed through normalization and fully connected layer processing. According to such a realization mode, since the feature extraction always involves the local features of a window section, thus content sentiment analysis of the local features is omitted. As a result, when the local features and the preset aspect features are used for data encoding, the result of sentiment polarities represented by the data encoding result is inaccurate, which leads to inaccurate sentiment polarity prediction.

The following illustrates example applications in which an information processing apparatus according to an embodiment of the disclosure is provided. The information processing apparatus provided in the embodiments of the disclosure may be implemented as various types of user terminals such as smart phones, tablet computers, and notebook computers, and may also be implemented as a server. An example application in which the information processing apparatus is implemented as the server will be illustrated below.

Figure 2:
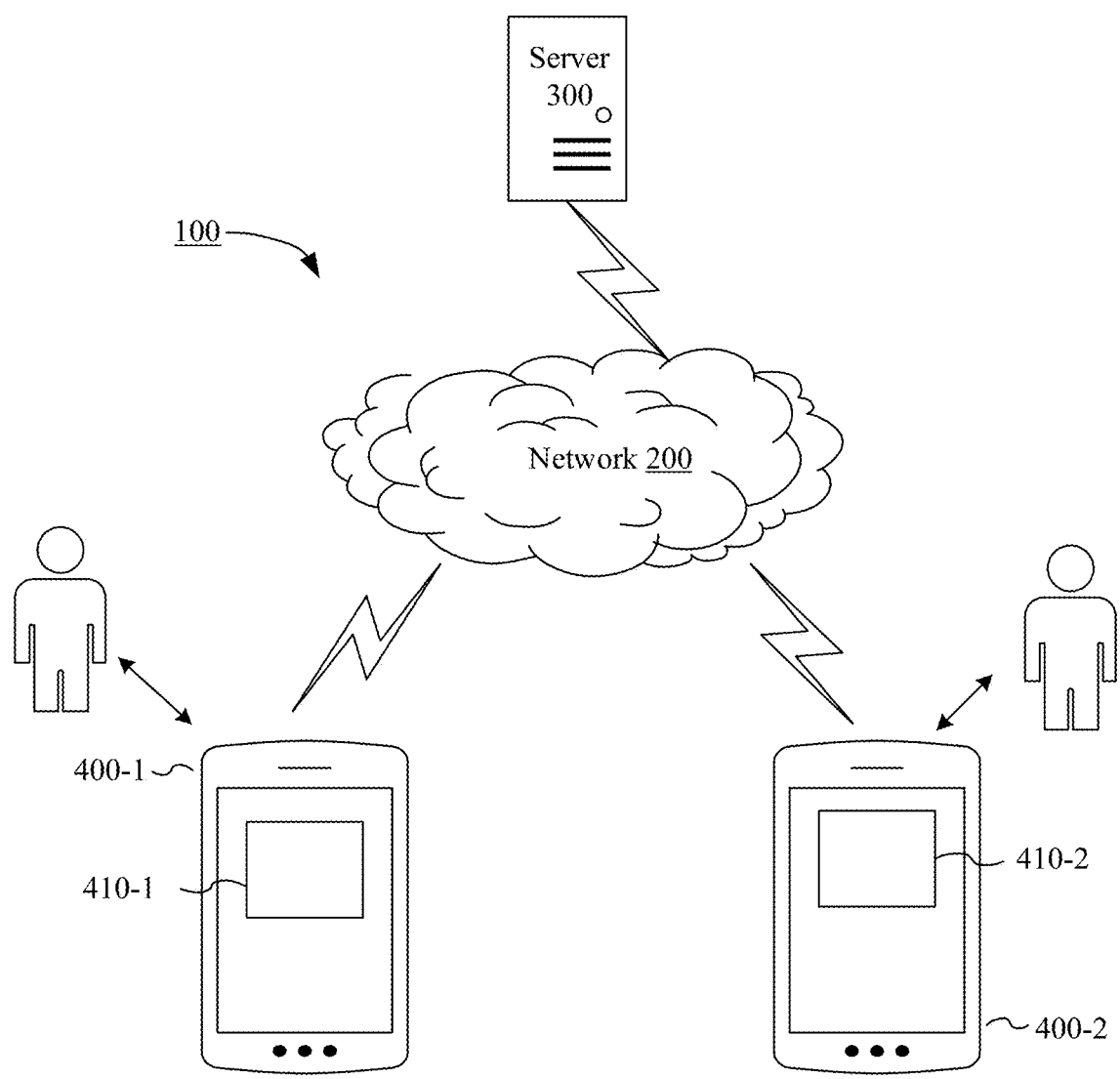
FIG. 2 is a schematic structural diagram of an information processing system architecture according to an example embodiment of the disclosure.

FIG. 2 is a schematic diagram of an architecture of an information processing system 100 according to an example embodiment of the disclosure. To support an example application, a terminal 400 (a terminal 400-1 and a terminal 400-2 are illustratively shown) is connected to a server 300 by a network 200. The network 200 may be a wide area network or a local area network, or a combination of the two, and uses a radio link to implement data transmission.

The terminal 400 is configured to send a sentiment analysis request for source data to the server 300 on a graphical interface 410 (a graphical interface 410-1 and a graphical interface 410-2 are illustratively shown). The server 300 is configured to: obtain source data in a real-time sentiment analysis request; encode each piece of sub-data in the source data based on a target word feature vector to obtain a hidden feature vector corresponding to each piece of sub-data, the target word feature vector representing a sentiment feature standard; obtain a word feature vector corresponding to the source data based on the hidden feature vector corresponding to each piece of sub-data; and input the word feature vector into a preset sentiment classification network for prediction to obtain a sentiment polarity prediction result of the source data, and send the sentiment polarity prediction result to the terminal 400.

The information processing apparatus provided in the embodiments of the disclosure may be implemented in a manner of hardware, or a combination of hardware and software. The following describes various example implementations of the information processing apparatus provided in the embodiments of the disclosure.

Figure 3:
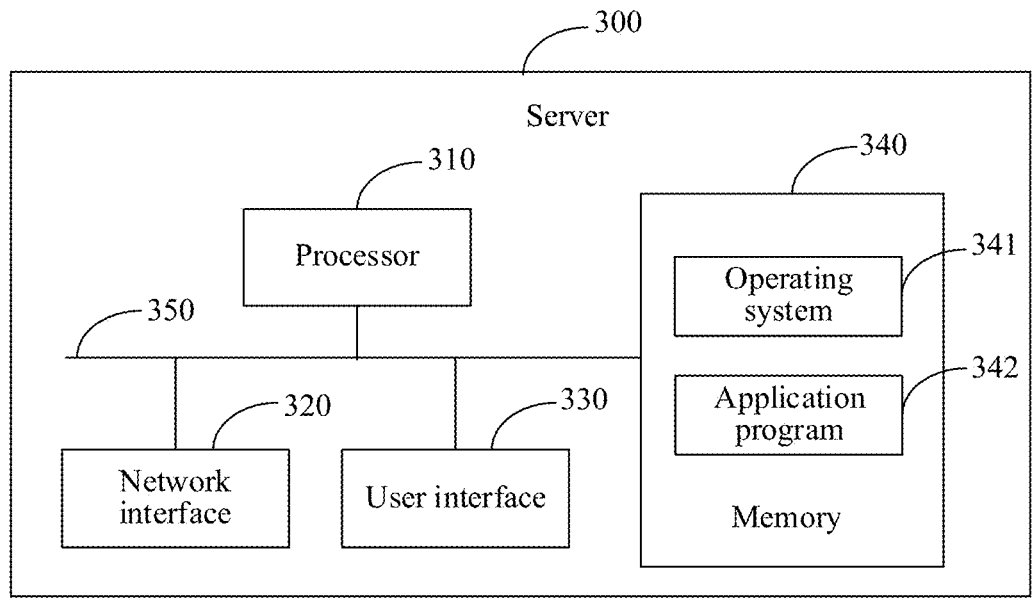
FIG. 3 is a schematic structural diagram of an information processing apparatus according to an example embodiment of the disclosure.

FIG. 3 is a schematic diagram of a structure of a server 300 according to an example embodiment of the disclosure. The structure described here are not intended to be limiting. For example, some components described below may be eliminated, or components not described below may be added to meet the special requirements of certain applications.

The server 300 shown in FIG. 3 includes: at least one processor 310, a memory 340, at least one network interface 320, and a user interface 330. Components in the server 300 are coupled together by using a bus system 350. It would be understood that the bus system 350 is configured to implement connection and communication between the components. In addition to a data bus, the bus system 350 further includes a power bus, a control bus, and a status signal bus. However, for ease of clear description, all types of buses are marked as the bus system 350 in FIG. 3.

The user interface 330 may include a display, a keyboard, a mouse, a trackball, a click wheel, a key, a button, a touchpad, or a touch screen.

The memory 340 may be a volatile memory or a non-volatile memory, or may include a volatile memory and a non-volatile memory. The non-volatile memory may be a read-only memory (ROM). The volatile memory may be a random access memory (RAM). The memory 340 described in this embodiment of the disclosure aims to include any suitable type of memories.

An example embodiment of the disclosure provides an information processing apparatus, including:

a memory, configured to store executable instructions; and a processor, configured to implement an information processing method provided in the embodiments of the disclosure when executing the executable instructions stored in the memory.

The memory 340 in the embodiments of the disclosure may store data to support operation of the server 300. Examples of these types of data include any computer program to be operated on the server 300, for example, an operating system 341 and an application program 342. The operating system 341 includes various system programs, for example, a framework layer, a core library layer, a driver layer, and the like, which are used for implementing various basic services and processing a task based on hardware. The application program 342 may include various application programs.

In an example in which the information processing method provided in the embodiments of the disclosure is implemented by a combination of software and hardware, the information processing method provided in the embodiments of the disclosure may be directly embodied as a combination of software modules executed by the processor 310. The software modules may be located in a storage medium, and the storage medium is located in the memory 340. The processor 310 reads executable instructions included in the software modules in the memory 340 and uses corresponding hardware (for example, including the processor 310 and other components connected to the bus 350) in combination, to complete the method provided in the embodiments of the disclosure.

In an example, the processor 310 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The information processing method in the embodiments of the disclosure will be described and implemented in conjunction with the foregoing example applications and implementations of the information processing apparatus in the embodiments of the disclosure. The information processing apparatus being a server is described as an example.

Figure 4:
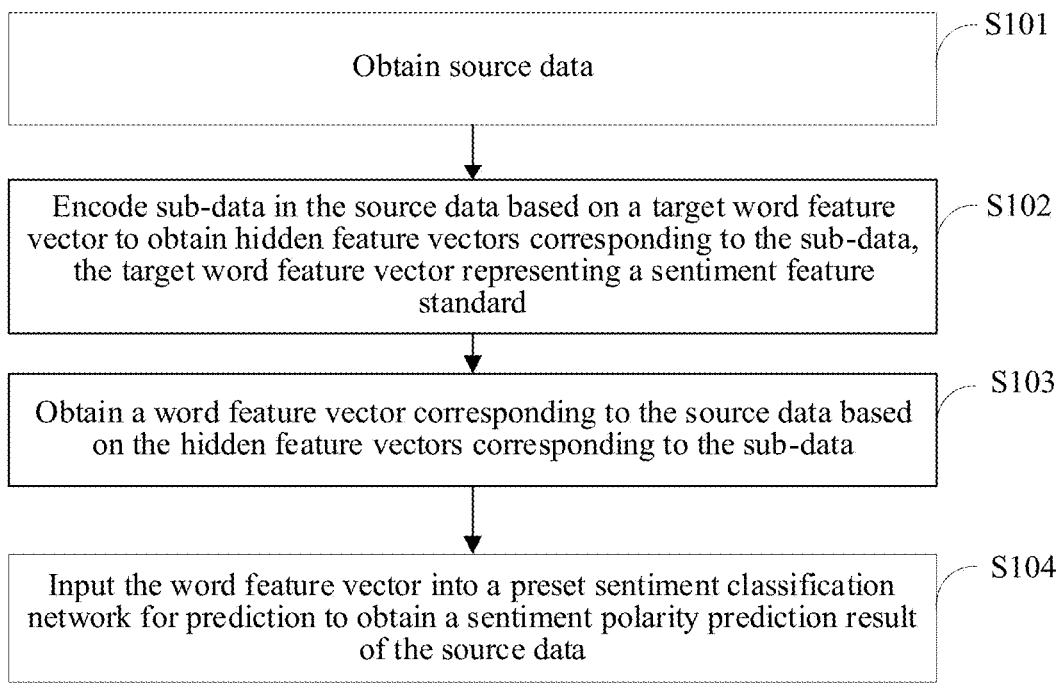
FIG. 4 is a schematic flowchart of an information processing method according to an example embodiment of the disclosure.

FIG. 4 is a schematic flowchart of a method according to an example embodiment of the disclosure, and a description is made with reference to operations shown in FIG. 4.

S101: Obtain source data.

S102: Encode sub-data in the source data based on a target word feature vector to obtain hidden feature vectors corresponding to the sub-data. The target word feature vector represents a sentiment feature standard.

S103: Obtain a word feature vector corresponding to the source data based on the hidden feature vectors corresponding to the sub-data.

S104: Input the word feature vector into a preset sentiment classification network for prediction to obtain a sentiment polarity prediction result of the source data.

In S101, in this embodiment of the disclosure, the server may perform sentiment classification analysis on a source language series, for use in scenarios of analyzing user evaluation, understanding user sentiment behavior, evaluating services, or the like.

The server obtains a sentence, a voice, or a text to be subjected to sentiment analysis, that is, obtains an object (for example, a text) to be predicted and analyzed, i.e., the source data.

In the embodiments of the disclosure, the source data may be evaluation information of a certain food, message information of a certain social application, or comment information of a certain product, etc. This is not limited in the embodiments of the disclosure.

In some embodiments of the disclosure, the server may obtain the source data requested for sentiment analysis from a certain application of the terminal.

Illustratively, the source data may be: "boiled fish with pickled cabbage and chili is delicious".

In S102, the server may directly encode the sub-data in the source data by using the target word feature vector to obtain the hidden feature vectors corresponding to the sub-data.

The sub-data in the source data may be each word in the source data. This is not limited in the embodiments of the disclosure.

In the embodiments of the disclosure, the method may be an information processing method for aspect-based sentiment analysis. In this way, the target word feature vector may be a sentiment-related feature vector, such as, Aspect Embedding. This is not limited in the embodiments of the disclosure.

It would be understood that the aspect-based sentiment analysis aims to predict sentiment polarities of a given aspect or term in a text (source data), and may provide more detailed information than general sentiment analysis.

In the embodiments of the disclosure, the server may obtain the target word feature vector in advance. The target word feature vector herein represents a sentiment feature standard. The sentiment feature standard represents a criterion for determining which type of emotion an object with a sentiment polarity has. Sentiment polarities are different attributes of emotions, which represent the sentiment biases represented by the data, such as positivity, negativity, neutrality, and conflict.

The target word feature vector may be priori data, and may also be trained in advance through a large number of sentiment features. In the embodiments of the disclosure, the server may perform opinion mining and sentiment analysis on user comments in order to provide valuable information for merchants and consumers. The embodiments of the disclosure focus on the sentiment polarity of an aspect category or a target term in a text, and aspect term extraction to obtain a term word feature vector, i.e., the target word feature vector. Sentiment analysis (ABSA) based on fine granularity (classification of different subclasses of objects in the same object) enables comments to be better understood than conventional sentiment analysis. An ABSA-based model has been developed to deal with two different subtasks: aspect-category sentiment analysis (ACSA) and aspect-term sentiment analysis (ATSA). The objective of ACSA is to predict a sentiment bias for a given aspect of one of several predefined categories. The objective of ATSA is to identify a sentiment bias of the target term that appears in the text, which may be a multi-word phrase or a word.

ATSA: Perform sentiment analysis on Aspect-Term marked in a given sentence; and use a relation between or positions of a target word and surrounding context words, or use a dependency tree structure, or simply determine the number of words between them as correlation information.

ACSA: An attention-based long short term memory (LSTM) uses embedded vectors pointing to aspect words to selectively focus on a representation region generated by the LSTM.

Illustratively, in the source data: "Average to good Thai food, but terrible delivery", ATSA analyzes the sentiment polarity of the term, Thai food. ACSA analyzes the sentiment polarity of the aspect "service" even if "service" does not appear in the sentence.

In some embodiments of the disclosure, a process in which the server encodes the sub-data in the source data based on the target word feature vector to obtain the hidden feature vectors corresponding to the sub-data includes: mode 1 and mode 2.

Mode 1: the server encodes the sub-data in the source data based on the target word feature vector and the preset gated nonlinear transformation model to obtain the sub-feature vectors corresponding to the sub-data, and determines the sub-feature vectors corresponding to the sub-data as the hidden feature vectors corresponding to the sub-data.

Mode 2: the server encodes the sub-data in the source data based on the target word feature vector and the preset gated nonlinear transformation model to obtain the sub-feature vectors corresponding to the sub-data, and performs feature transformation encoding of a preset depth level on the sub-data in the source data based on the sub-feature vectors corresponding to the sub-data and a preset feature transformation model to obtain the hidden feature vectors corresponding to the sub-data.

In an example embodiment, the server encodes each piece of sub-data in the source data, or the server encodes partial sub-data in the source data. As an example for description, a case in which each piece of sub-data in the source data is encoded is described below.

The server encodes the sub-data in the source data through a deep transition encoder based on the target word feature vector to obtain the hidden feature vectors corresponding to the sub-data.

The deep transition encoder includes a sentiment-related gated unit, or includes the sentiment-related gated unit cascaded with a transition gated unit of a preset depth level. This is not limited in the embodiments of the disclosure.

In the embodiments of the disclosure, the sentiment-related gated unit may be an aspect-guided gated recurrent unit (GRU) (A-GRU), and the transition gated unit may be a transition GRU (T-GRU). An input of A-GRU is related to each piece of sub-data, and T-GRU is related to the previous-stage A-GRU or T-GRU. A combination of A-GRU and multiple T-GRUs constitutes a basic block of an aspect-guided fine-grained sentiment analysis model (preset sentiment classification model) provided in the embodiments of the disclosure.

The A-GRU may be based on the preset gated nonlinear transformation model, and the T-GRU may be based on the preset feature transformation model.

In the embodiments of the disclosure, the preset gated nonlinear transformation model is configured to perform nonlinear transformation on the sub-data to select a sub-feature vector that meets the target word feature vector. The preset feature transformation model is configured to perform feature transformation on the sub-feature vectors of the sub-data, to make the sentiment features more significant through multi-level feature transformation.

In the embodiments of the disclosure, when the deep transition encoder includes the sentiment-related gated unit, for mode 1, the server uses the target word feature vector to perform correlation processing with the sub-data in the source data to obtain a first feature vector, and then encodes the sub-data in the source data based on the first feature vector and the preset gated nonlinear transformation model to obtain the sub-feature vectors corresponding to the sub-data.

When the deep transition encoder includes the sentiment-related gated unit cascaded with the transition gated unit of the preset depth level, for mode 2, the server may first use the target word feature vector to guide the encoding of each piece of sub-data to obtain the sub-feature vectors through the sentiment-related gated unit, then perform step-by-step feature transformation on the sub-feature vectors through the transition gated unit of the preset depth level, highlight the sentiment feature part, and finally obtain the hidden feature vector corresponding to each piece of sub-data.

In an example embodiment, the preset depth level may be 3 or 4. This is not limited in the embodiments of the disclosure.

A GRU may be regarded as a variant of a long short term memory (LSTM) network. For an A-GRU, the preset gated nonlinear transformation model at time t is shown in formula (1):

$$h_t = (1-z_t) \odot h_{t-1} + z_t \odot \tilde{l}_t \quad (1)$$

where $\odot$ is an element-wise product, $\tilde{l}_t$ is a forward hidden feature vector or a reverse hidden feature vector, $z_t$ is an update gate at time t, and $h_{t-1}$ is a hidden feature vector at the previous time.

The time herein refers to the previous time of the encoding time, and the time corresponds to the sub-data. During forward encoding, the previous time corresponds to the previous sub-data. During reverse encoding, the previous time corresponds to the next sub-data, that is, $x_t$ corresponds to the previous $x_n$, i.e., corresponding to the sub-data.

Candidate activation $\tilde{l}_t$ (i.e., the forward hidden feature vector or the reverse hidden feature vector) is calculated as shown in formula (2):

$$\tilde{l}_t = \ldots \setminus g_t \odot (W_{xh} x_t) \pm r_t \odot (W_{hh} h_{t-1})) + I_t \odot H_1(x_t) + g_t \odot H_2(x_t) \quad (2)$$

where $H_1(x_t) = W_1 x_t$, $H_2(x_t) = W_2 x_t$ is linear transformation of an input vector, $I_t = \sigma(W_{xi} x_t + W_{hi} h_{t-1})$ is a linear transformation gate, $g_t = \text{relu}(W_a + W_{hg} h_{t-1})$ is an aspect control transformation gate, W related parameters are all trained model parameters and are known quantities, and $r_t$ is a reset gate at time t.

In the embodiments of the disclosure, $g_t$ is the output of the aspect control transformation gate, and is related to Aspect Embedding and $h_{t-1}$. $\tilde{l}_t$ also a vector obtained after the $h_{t-1}$ input is provided.

In the embodiments of the disclosure, the preset feature transformation model is shown in formula (3):

$$h_t^i = (1-z_t^i) \odot h_t^{i-1} + z_t^i \odot \tilde{l}_t \quad (3)$$

where $h_t^i$ is an $i^{th}$-level hidden feature vector of an $i^{th}$-level T-GRU at time t, $h_t^{i-1}$ is an $(i-1)^{th}$-level hidden feature vector of an $(i-1)^{th}$-level T-GRU at time t, $z_t^i$ is $i^{th}$-level update gate at time t, and $\tilde{l}_t$ is the output of A-GRU at time t.

In an example embodiment, candidate activation $\tilde{l}_t$ is calculated as shown in formula (4):

$$\tilde{l}_t = \ldots \setminus r_t^i \odot (W_h^i h_t^{i-1})) \quad (4)$$

where $r_t^i$ is an $i^{th}$-level reset gate at time t, and $W_h^i$ is a network parameter that is to be learned.

In some embodiments of the disclosure, when the sub-data in the source data is represented by the $t^{th}$ piece of sub-data, where t is greater than or equal to 1 and less than or equal to N, and N is the total number of pieces of the sub-data in the source data.

The process in which the server encodes the sub-data in the source data based on the target word feature vector and the preset gated nonlinear transformation model to obtain the sub-feature vectors corresponding to the sub-data includes the following operation(s).

When t is not 1, the server obtains a $(t-1)^{th}$ forward hidden feature vector in the source data, encodes the $t^{th}$ piece of sub-data based on the $(t-1)^{th}$ forward hidden feature vector, the target word feature vector, and the preset gated nonlinear transformation model to obtain a $t^{th}$ forward hidden feature vector corresponding to the $t^{th}$ piece of sub-data, and continues to encode a $(t+1)^{th}$ piece of sub-data until an $N^{th}$ forward hidden feature vector of an $N^{th}$ piece of sub-data is obtained; when t is 1, the server encodes a first piece of sub-data based on the target word feature vector and the preset gated nonlinear transformation model to obtain a first forward hidden feature vector corresponding to the first piece of sub-data; and the server determines the first forward hidden feature vector to the $N^{th}$ forward hidden feature vector as the sub-feature vectors corresponding to the sub-data.

In this way, the server realizes the forward encoding of each piece of sub-data of the source data based on the target word feature vector.

In some embodiments of the disclosure, when each piece of sub-data in the source data is represented by the $t^{th}$ piece of sub-data, where t is greater than or equal to 1 and less than or equal to N, and N is the total number of pieces of the sub-data in the source data.

The process in which the server encodes the sub-data in the source data based on the target word feature vector and the preset gated nonlinear transformation model to obtain the sub-feature vectors corresponding to the sub-data includes the following operation(s).

Based on the foregoing, the server obtains the first forward hidden feature vector to the $N^{th}$ forward hidden feature vector; when t is not N, the server obtains a $(t+1)^{th}$ reverse hidden feature vector in the source data, encodes the $t^{th}$ piece of sub-data based on the $(t+1)^{th}$ reverse hidden feature vector, the target word feature vector, and the preset gated nonlinear transformation model to obtain a $t^{th}$ reverse hidden feature vector corresponding to the $t^{th}$ piece of sub-data, and continues to encode a $(t-1)^{th}$ piece of sub-data until a first reverse hidden feature vector of a first piece of sub-data is obtained; when t is N, the server encodes a $t^{th}$ piece of sub-data based on the target word feature vector and the preset gated nonlinear transformation model to obtain a $t^{th}$ reverse hidden feature vector corresponding to the $t^{th}$ piece of sub-data; the server respectively splices the first forward hidden feature vector to the $N^{th}$ forward hidden feature vector and the first reverse hidden feature vector to the $N^{th}$ reverse hidden feature vector in a one-to-one correspondence (i.e., the first forward hidden feature vector is spliced with the first reverse hidden feature vector, and the $N^{th}$ forward hidden feature vector is spliced with the $N^{th}$ reverse hidden feature vector), to obtain a first sub-feature vector to an $N^{th}$ sub-feature vector; and the server determines the first sub-feature vector to the $N^{th}$ sub-feature vector as the sub-feature vectors corresponding to the sub-data.

In this way, the server realizes bidirectional (forward and reverse) encoding of the sub-data of the source data based on the target word feature vector.

Processes of forward coding and bidirectional coding are based on the same implementation principle but are different in that: the forward coding is a forward encoding process of encoding from the first piece of sub-data to the $N^{th}$ piece of sub-data; and the bidirectional coding is encoding implemented by combining a reverse encoding process of encoding from the $N^{th}$ piece of sub-data to the first piece of sub-data with the forward encoding process. That is, in the embodiments of the disclosure, the deep transition encoder may be a deep unidirectional transition encoder, and may also be a deep bidirectional transition encoder.

In the embodiments of the disclosure, except for the sub-data encoded for the first time, the encoding of other sub-data is related to the encoding result (i.e., the hidden feature vector) of the previous piece of sub-data.

Based on the foregoing, in some embodiments of the disclosure, when using the preset feature transformation model for deep transition encoding, in operation in which the server performs feature transformation encoding of a preset depth level on the sub-data in the source data based on the sub-feature vectors corresponding to the sub-data and a preset feature transformation model to obtain the hidden feature vectors corresponding to the sub-data includes: when the preset depth level is an L level, for a first level of a $t^{th}$ sub-feature vector, the server performs first feature transformation encoding on the $t^{th}$ sub-feature vector according to the preset feature transformation model to obtain a first-level hidden feature vector, L being a positive integer greater than 1.

For a $j^{th}$ level of the $t^{th}$ sub-feature vector, the server obtains a $(j-1)^{th}$-level hidden feature vector of the $t^{th}$ sub-feature vector, where the $(j-1)^{th}$-level hidden feature vector is obtained by performing $(j-1)^{th}$ feature transformation encoding on the $t^{th}$ sub-feature vector, and j is greater than 1 and less than L; the server performs $j^{th}$ feature transformation encoding on the $t^{th}$ sub-feature vector according to the $(j-1)^{th}$-level hidden feature vector and the preset feature transformation model to obtain a $j^{th}$-level hidden feature vector, and continues to perform $(j+1)^{th}$ feature transformation encoding on the $t^{th}$ sub-feature vector until an $L^{th}$-level hidden feature vector is obtained; and the server determines the $L^{th}$-level hidden feature vector as a hidden feature vector corresponding to the $t^{th}$ piece of sub-data.

In an example embodiment, at time j, i.e., when $k^{th}$-level encoding is performed on the $j^{th}$ piece of sub-data, the hidden feature vector calculation formulas (5) and (6) of the deep transition encoder are as follows:

$$\vec{h}_{j,0} = A\text{-}GRU(x_j, \vec{h}_{j-1,L_s}) \quad (5)$$

$$\vec{h}_{j,k} = T\text{-}GRU_k(\vec{h}_{j,k-1}) \text{ for } 1 \leq k \leq L_s \quad (6)$$

where $L_s$ represents the depth of the deep transition encoder, i.e., a preset depth level, and $\vec{h}_{j,0}$ is a vector outputted by A-GRU at time t, which is related to $x_j$ and the output of the last-stage T-GRU at the previous time. $\vec{h}_{j,k}$ is an acquisition formula of T-GRU at time j, which is related to the output of the previous-stage T-GRU or the output vector of A-GRU at time j.

After the forward deep transition encoding of the server, the sub-feature vector corresponding to a $j^{th}$ word (sub-data) is $$\vec{h}_j = \vec{h}_{j,L_s}.$$

Reverse deep transition encoding is calculated in the same way, and the sub-feature vectors obtained by encoding in the two directions are spliced to obtain the final encoded representation $$C \equiv \{[\vec{h}_{j,L_s}, \overleftarrow{h}_{j,L_s}]\}$$

(i.e., the hidden feature vector) corresponding to the $j^{th}$ word.

It would be understood that the server may encode each piece of sub-data of the source data in both forward and reverse directions, and realize multi-directional encoding of the source data such as forward correlation and reverse correlation, so that the sentiment feature of the hidden feature vector is more accurate.

Furthermore, in the embodiments of the disclosure, in a process of obtaining the word feature vectors, it is also possible to first use GRU for processing, and then use A-GRU and T-GRU for processing, so as to improve the quality of the obtained word feature vector.

In S103, the server selects the word feature vector corresponding to the source data based on the hidden feature vectors corresponding to the sub-data.

In the embodiments of the disclosure, the server may obtain the word feature vector corresponding to the source data in a maximum pooling layer based on the hidden feature vectors corresponding to the sub-data. An input of the maximum pooling layer is connected to the deep transition encoder, and an output of the maximum pooling layer is connected to the preset sentiment classification network.

In some embodiments of the disclosure, the server may determine a maximum hidden feature vector from the hidden feature vectors corresponding to the sub-data, and determine the maximum hidden feature vector as the word feature vector.

In some embodiments of the disclosure, the server may determine a maximum hidden feature vector from the hidden feature vectors corresponding to the sub-data, and perform correlation processing on the maximum hidden feature vector and the target word feature vector to obtain the word feature vector.

The server may directly use the maximum hidden feature vector as the word feature vector, or may obtain the word feature vector through aspect sentiment feature correlation processing again by using the maximum hidden feature vector. In the latter case, since the server performs the aspect sentiment feature correlation processing again, the sentiment feature of the word feature vector is more prominent, which improves the accuracy of subsequent sentiment prediction.

In S104, after the server obtains the word feature vector, equivalent to completing feature configuration, the server further inputs the word feature vector to the preset sentiment classification network (i.e., a fully connected layer) for sentiment prediction, so as to obtain the sentiment polarity prediction result of the source data.

In the embodiments of the disclosure, the preset sentiment classification network may be a machine model network that is obtained based on word feature vector training and is related to the sentiment polarity output. After the server completes the training of the preset sentiment classification network, when the construction of the word feature vector corresponding to source data that is to be detected or predicted is completed, the server directly inputs the word feature vector into the preset sentiment classification network to obtain an output result of sentiment polarity probability distribution representing the sentiment polarity, and then obtains the sentiment polarity prediction result of the source data based on a correspondence between the prediction probability and the sentiment polarity.

It would be understood that the server may directly encode the sub-data in the source data by using the sentiment feature standard (i.e., the target word feature vector). That is, the sub-data is encoded under the guidance of the sentiment feature standard, which makes sentiment features of the source data more prominent, thereby improving the accuracy of the sentiment polarity prediction result when word feature vectors with prominent sentiment features are used for sentiment polarity prediction.

Figure 5:
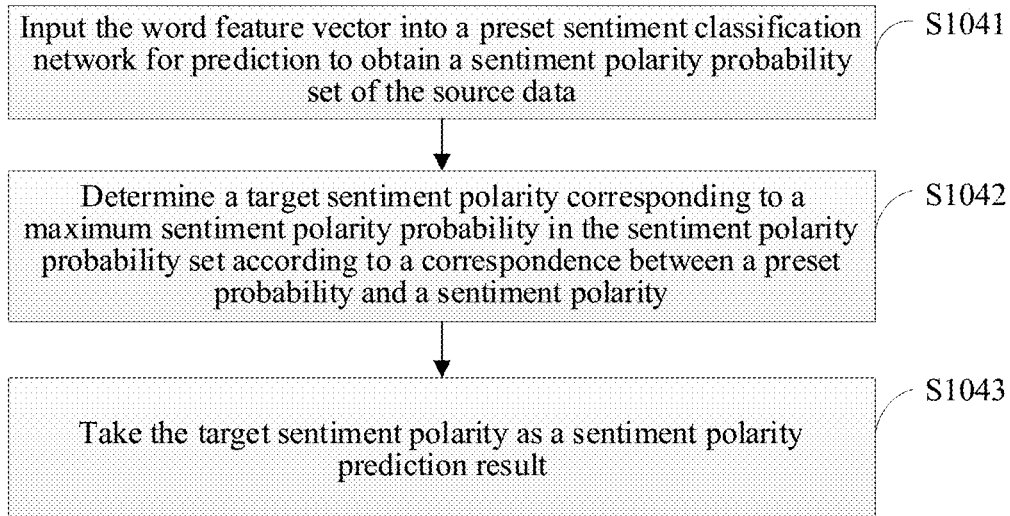
FIG. 5 is a schematic flowchart of an information processing method according to an example embodiment of the disclosure.

FIG. 5 is a schematic flowchart of a method according to an example embodiment of the disclosure. S104 shown in FIG. 4 may be implemented through S1041 to S1043, and is illustrated below in conjunction with the operations.

S1041: Input the word feature vector into a preset sentiment classification network for prediction to obtain a sentiment polarity probability set of the source data, where the sentiment polarity probability set includes prediction probabilities corresponding to preset sentiment polarities. For example, the preset sentiment polarities include negativity, positivity, and neutrality. For example, the sentiment polarity probability set includes a prediction probability of 0.9 corresponding to the negativity, a prediction probability of 0.02 corresponding to the positivity, and a prediction probability of 0.08 corresponding to the neutrality. The range of a probability value corresponding to negativity, positivity and neutrality may be determined as appropriate in various manners.

S1042: Determine a target sentiment polarity corresponding to a maximum sentiment polarity probability in the sentiment polarity probability set according to a correspondence between a preset probability and a sentiment polarity.

S1043: Determine the target sentiment polarity as a sentiment polarity prediction result.

In the embodiments of the disclosure, the server may input the word feature vector into the preset sentiment classification network for prediction to obtain a sentiment polarity probability set of the source data, then determine a target sentiment polarity corresponding to a maximum sentiment polarity probability in the sentiment polarity probability set according to a correspondence between a preset probability and a sentiment polarity, and determine the target sentiment polarity as the sentiment polarity prediction result.

In the embodiments of the disclosure, the correspondence between the preset probability and the sentiment polarity represents sentiment polarities corresponding to sentiment polarity probabilities.

In the embodiments of the disclosure, the sentiment polarities represent sentiment labels. The sentiment polarities may include categories such as negativity, positivity, or neutrality, or may represent categories such as negativity, positivity, neutrality, or conflict. The specific number of categories is not limited in the embodiments of the disclosure.

The preset sentiment classification network is a trained network used to output the sentiment polarity probabilities.

After the word feature vector is inputted to the preset sentiment classification network, a preset-dimensional sentiment polarity probability vector (1×N) is outputted. The number N of preset dimensions is the same as the number of preset sentiment polarities. For example, when sentiment polarity prediction includes three types of sentiments: positivity, neutrality, and negativity, the output of the trained preset sentiment classification network is three-dimensional, i.e., having a 1*x vector based on three sentiment polarity probabilities.

In the embodiments of the disclosure, the sentiment polarity probability set is a sentiment polarity probability vector, and the correspondence between the preset probability and the sentiment polarity represents a correspondence between positions of elements in each column in the sentiment polarity probability vector and the sentiment polarity.

In an example embodiment, suppose that the sentiment polarity probability set is a vector [0.1, 0.8, 0.1], the correspondence between the preset probability and the sentiment polarity is that the elements in the first column correspond to the negativity, the elements in the second column correspond to the positivity, and the elements in the third column correspond to the neutrality. In this way, it may be determined that the probability of the negativity is 0.1, the probability of the positivity is 0.8, and the probability of the neutrality is 0.1.

In the embodiments of the disclosure, label numbers 0, 1, and 2 may be used for indicating the position of each probability in the sentiment polarity probability set, then the correspondence between the preset probability and the sentiment polarity is that label 0 corresponds to the negativity, label 1 corresponds to the positivity, and label 2 corresponds to the neutrality.

It would be understood that since sentiment polarity categories are not limited, the length of the sentiment polarity probability set also changes accordingly. This is not limited in the embodiments of the disclosure.

In the embodiments of the disclosure, the server determines a maximum sentiment polarity probability in the sentiment polarity probability set according to the correspondence between the preset probability and the sentiment polarity, so as to determine the target sentiment polarity corresponding to the maximum sentiment polarity probability as the sentiment polarity prediction result of the source data.

In an example embodiment, suppose that the sentiment polarity probability set is a vector [0.1, 0.8, 0.1], and label numbers 0, 1, and 2 are used for indicating the position of each probability in the sentiment polarity probability set from front to back, then the correspondence between the preset probability and the sentiment polarity is that label 0 corresponds to the negativity, label 1 corresponds to the positivity, and label 2 corresponds to the neutrality. The maximum sentiment polarity probability in the sentiment polarity probability set is 0.8, and the position label number of 0.8 is 1. Therefore, it is determined that the maximum sentiment polarity probability 0.8 corresponds to the positivity. That is, the target sentiment polarity is "positive", and the "positive" is the sentiment polarity prediction result.

It would be understood that the server may predict the sentiment polarity based on the word feature vector and the sentiment polarity probability set outputted by the preset sentiment classification network, and encode each piece of sub-data in the source data based on the word feature vector, that is, each piece of sub-data is obtained after encoding under the guidance of the sentiment feature standard. The encoding makes the sentiment features of the word feature vector more prominent, so that the result of the sentiment polarity prediction based on the word feature vector and the sentiment polarity probability set outputted by the preset sentiment classification network is more accurate.

Figure 6:
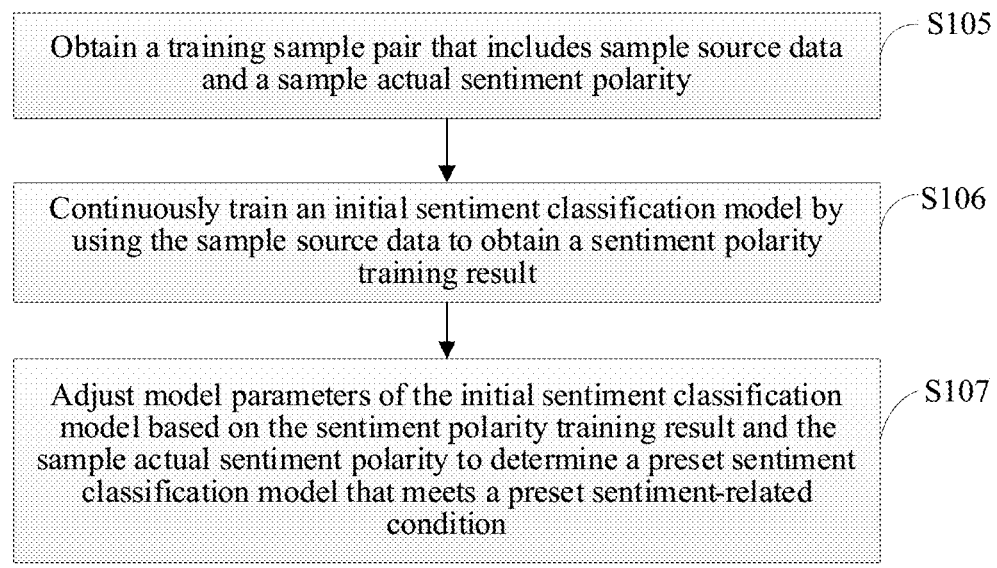
FIG. 6 is a schematic flowchart of an information processing method according to an example embodiment of the disclosure.

FIG. 6 is a schematic flowchart of a method according to an example embodiment of the disclosure. Based on FIG. 4, before S101, the following S105 to S107 may also be performed.

S105: Obtain a training sample pair that includes sample source data and a sample actual sentiment polarity.

S106: Continuously train an initial sentiment classification model by using the sample source data to obtain a sentiment polarity training result.

S107: Adjust model parameters of the initial sentiment classification model based on the sentiment polarity training result and the sample actual sentiment polarity to determine a preset sentiment classification model that meets a preset sentiment-related condition.

Figure 7:
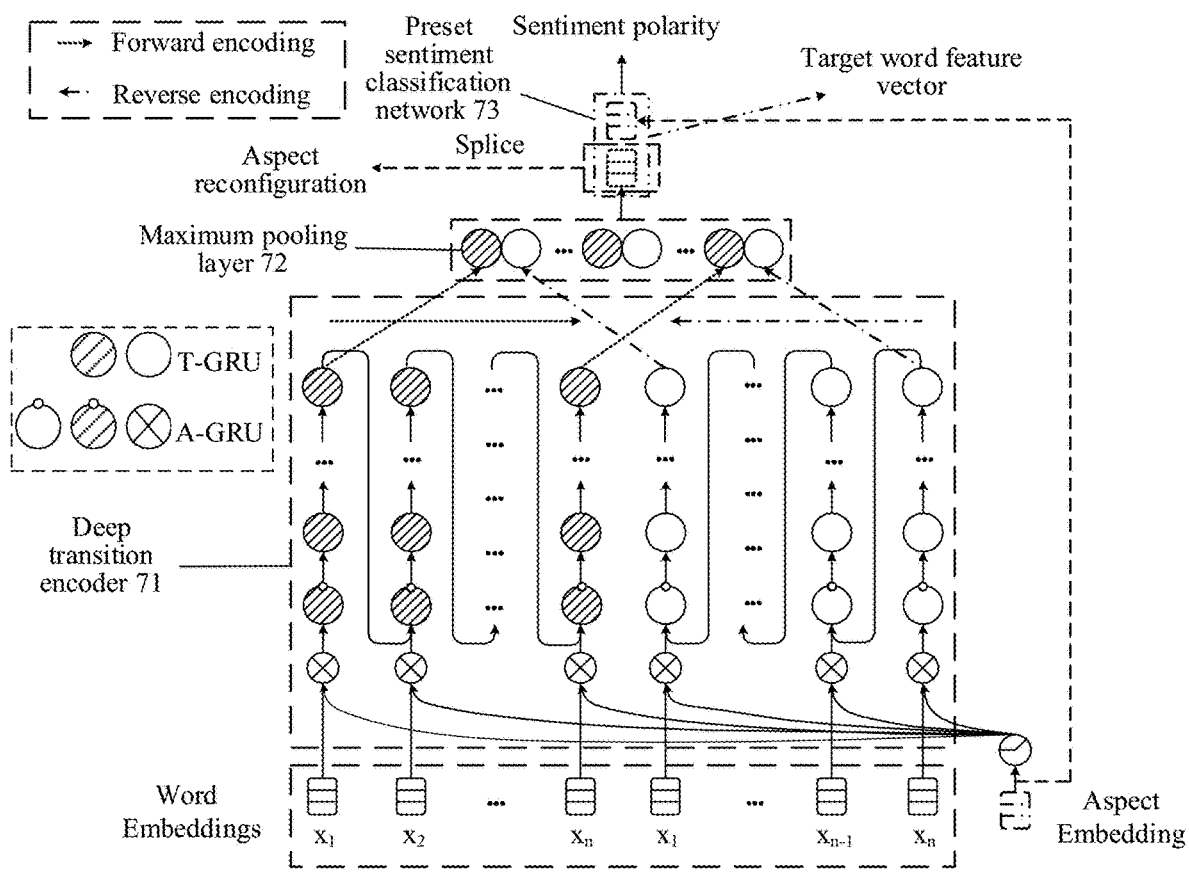
FIG. 7 is a diagram of a network architecture based on a gated unit according to an example embodiment of the disclosure.

In the embodiments of the disclosure, as shown in FIG. 7, a deep transition encoder 71, a maximum pooling layer 72, and a preset sentiment classification network 73 constitute a preset sentiment classification model. Before using the preset sentiment classification model to realize the sentiment prediction in S102 to S104 above, the server needs to pre-train the preset sentiment classification model.

In the embodiments of the disclosure, the server may obtain a sample pair including sample source data and a sample actual sentiment polarity from a large quantity of historical user data with known sentiment polarity results. The server obtains an initial sentiment classification model, and then uses sample source data to continuously train the initial sentiment classification model to obtain a sentiment polarity training result. An optimal preset sentiment classification model be obtained based on the sentiment polarity training result that is closer to a sentiment polarity training result, and a word feature vector obtained in the training process that is closer to a target word feature vector.

In an example embodiment, the server builds model training loss by using the sample actual sentiment polarity as supervision for the sentiment polarity training result and using the target word feature vector as supervision for the sample word feature vector (the word feature vector corresponding to the sample source data outputted in the training process), so as to adjust model parameters of the initial sentiment classification model according to the model training loss until the model converges (i.e., a preset sentiment-related condition is met). The server may adjust the model parameters by using an algorithm such as backpropagation or gradient descent, which will not be described here in this embodiment.

In the embodiments of the disclosure, the preset sentiment-related condition includes a preset sentiment polarity result condition and a preset sentiment feature condition. The preset sentiment polarity result condition represents that a difference between the sentiment polarity training result and the sample actual sentiment polarity is less than a first preset threshold. The preset sentiment feature condition represents that a difference between a sample word feature vector corresponding to the sample source data and the target word feature vector is less than a second preset threshold.

In the embodiments of the disclosure, each of the first preset threshold and the second preset threshold is an upper limit of a threshold within an allowable error, such as 5%. This is not limited in the embodiments of the disclosure. The first preset threshold and the second preset threshold may be the same, or may be different, or may be set according to an actual error. This is not limited in this embodiment of the disclosure.

The preset sentiment-related condition may be a loss function.

In an example embodiment, the preset sentiment-related condition may be formula (7):

$$J = \min\left(-\sum_{i=0}^{c0} y_i \log(p_i) + \lambda L\right) \quad (7)$$

where C0 is the number of sentiment categories, $y_i$ and $p_i$ are respectively an actual sentiment label value (corresponding to the sample actual sentiment polarity) and a predicted sentiment label value (corresponding to the sentiment polarity training result), $\lambda$ is a super-parameter, and L is a preset sentiment feature condition (corresponding to word feature vector loss between the sample word feature vector and the target word feature vector).

For different dataset types, i.e., different subtasks, the preset sentiment feature conditions are different.

For example, for the subtask of ACSA: For a predefined category dataset, the word feature vector loss function may be formula (8):

$$L_n = \min\left(-\sum_{i=0}^{C1} y_i^n \log(p_i^n)\right) \quad (8)$$

where C1 is the number of categories, and $y_i^n$ and $p_i^n$ are respectively an actual category label value (a determining standard) and a predicted category label value.

For the subtask of ATSA: For the predefined term dataset, the word feature vector loss function may be formula (9):

$$L_m = \min\left\{-\sum_{i=0}^{C2} [y_i^m \log(p_i^m) + (1 - y_i^m)\log(1 - p_i^m)]\right\} \quad (9)$$

where C2 is the number of words in a term, and $y_i^m$ and $p_i^m$ are respectively an actual category label value (a determining standard) and a predicted category label value.

In some embodiments of the disclosure, when the sentiment polarity training result and the sample actual sentiment polarity do not meet the preset sentiment-related condition, the model parameters of the initial sentiment classification model are adjusted to obtain an intermediate sentiment classification model, and the intermediate sentiment classification model is used to continue training until the preset sentiment classification model that meets the preset sentiment-related condition is obtained.

In an example training mode, the server first trains a sentiment classification model based on the sentiment polarity training result and the sample actual sentiment polarity. When the sentiment classification model meets a preset sentiment polarity result condition, that is, a difference between a prediction result of the sentiment classification model and a ground truth meets a condition, the server further trains the sentiment classification model according to the sample word feature vector and the target word feature vector, until the sentiment classification model meets the preset sentiment feature condition. That is, when the difference between the sample word feature vector and the target word feature vector meets the condition, the training of the preset sentiment classification model is completed.

It would be understood that the server may guide the encoding of sentences from the bottom through aspect, and strengthen an aspect-related sentiment feature through aspect reconstruction in the training process, to improve the accuracy of sentiment prediction.

A schematic example is used below to illustrate a process of predicting the sentiment polarity of the source data.

Figure 8:
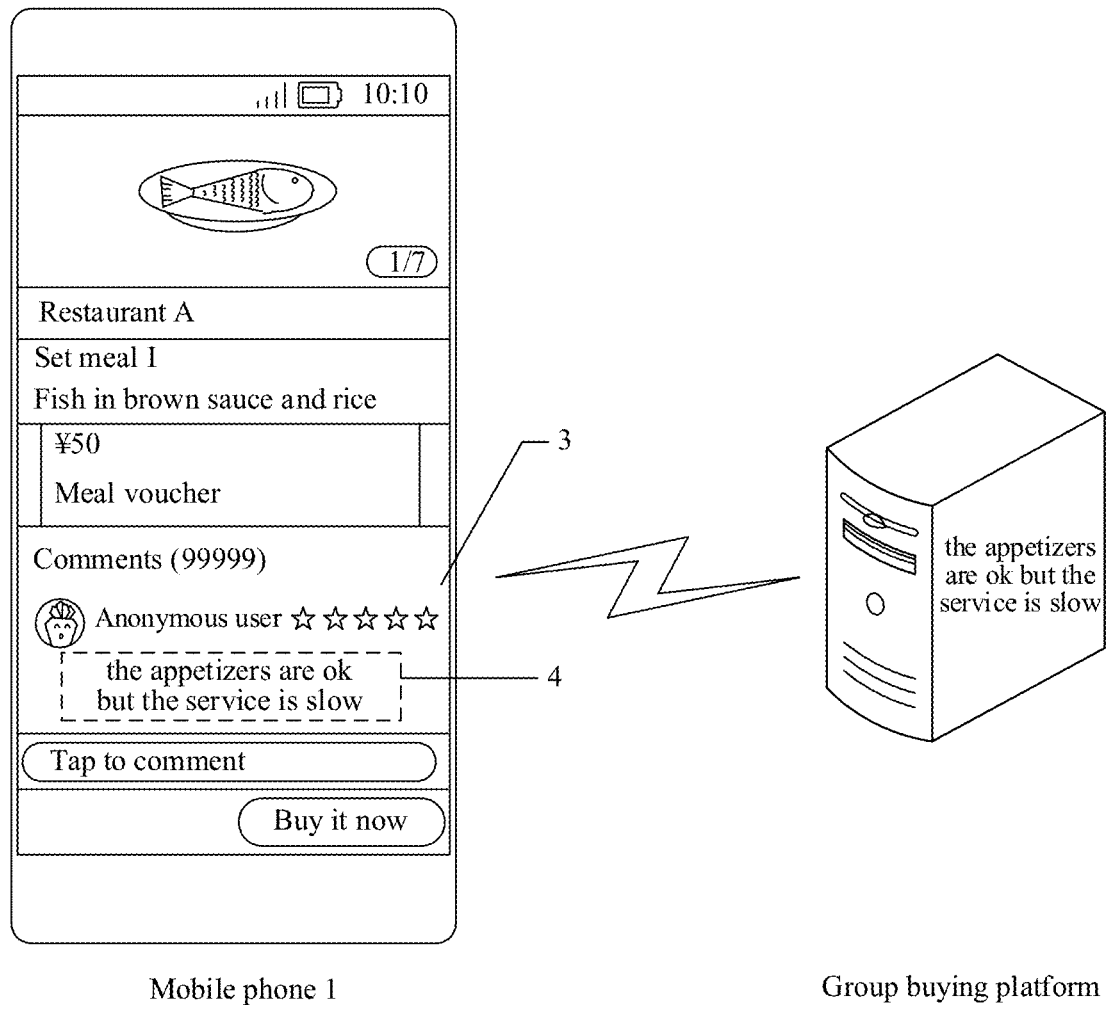
FIG. 8 is a schematic diagram of an application scenario of an information processing method according to an example embodiment of the disclosure.

As shown in FIG. 8, if a user has purchased a meal voucher for a restaurant A on a third-party platform, such as a group buying platform 2 (server) or an APP on his/her mobile phone 1, after the user has used the meal voucher, he/she may write comment information 4 about this meal in a comment region 3 of the restaurant A, that is, Word Embeddings (source data) are "the appetizers are ok but the service is slow". After the mobile phone 1 published that "the appetizers are ok but the service is slow", the group buying platform 2 may obtain the comment information, so as to perform sentiment polarity prediction on the comment information to determine the user's dining experience in the restaurant A. The result of the comment is expressed as a sentiment polarity, which is used for expressing the user's real sentiment or feeling about the meal (or experience at the restaurant A). As shown in FIG. 7, for "the appetizers are ok but the service is slow", n=9, where $x_1$ is "the", $x_2$ is "appetizers", $x_3$ is "are", $x_4$ is "ok", $x_5$ is "but", $x_6$ is "the", $x_7$ is "service", $x_8$ is "is", and $x_9$ is "slow". The group buying platform 2 performs forward encoding and reverse encoding on each word through a deep transition encoder based on $x_1$-$x_9$ and Aspect Embedding (target word feature vector). In forward encoding, except for $x_1$, $x_2$ to $x_9$ are all encoded based on an encoding result of the previous word, and Aspect Embedding is to perform correlation processing on each of $x_2$ to $x_9$ based on the encoding result of the previous word. Similarly, in reverse encoding, except for $x_9$, $x_8$ to $x_1$ are all encoded based on an encoding result of the next word, and Aspect Embedding is to perform correlation processing on each of $x_8$ to $x_1$ based on the encoding result of the next word. Finally, suppose that the group buying platform 2 obtains a forward-encoded 300×300 forward hidden feature vector and a reverse-encoded 300×300 reverse hidden feature vector, the 300×300 forward hidden feature vector and the 300×300 reverse hidden feature vector are spliced to obtain nine sub-feature vectors (i.e., hidden feature vectors), and each sub-feature vector is 600×600. A maximum hidden feature vector, i.e., a 600×600 vector, is determined from these nine sub-feature vectors. Correlation processing is performed on the maximum hidden feature vector and the target word feature vector to obtain a word feature vector, and the word feature vector is inputted to a preset sentiment classification network for prediction to obtain a sentiment polarity probability set [0.1, 0.8, 0.1] of the source data. According to a correspondence between a preset probability and a sentiment polarity, label numbers 0, 1, and 2 are used for indicating the position of each probability in the sentiment polarity probability set from front to back, then the correspondence between the preset probability and the sentiment polarity is that label 0 corresponds to the negativity, label 1 corresponds to the positivity, and label 2 corresponds to the neutrality. It is determined that the target sentiment polarity corresponding to the maximum sentiment polarity in the sentiment polarity probability set is "positive", and the "positive" is determined as a sentiment polarity prediction result.

Figure 9:
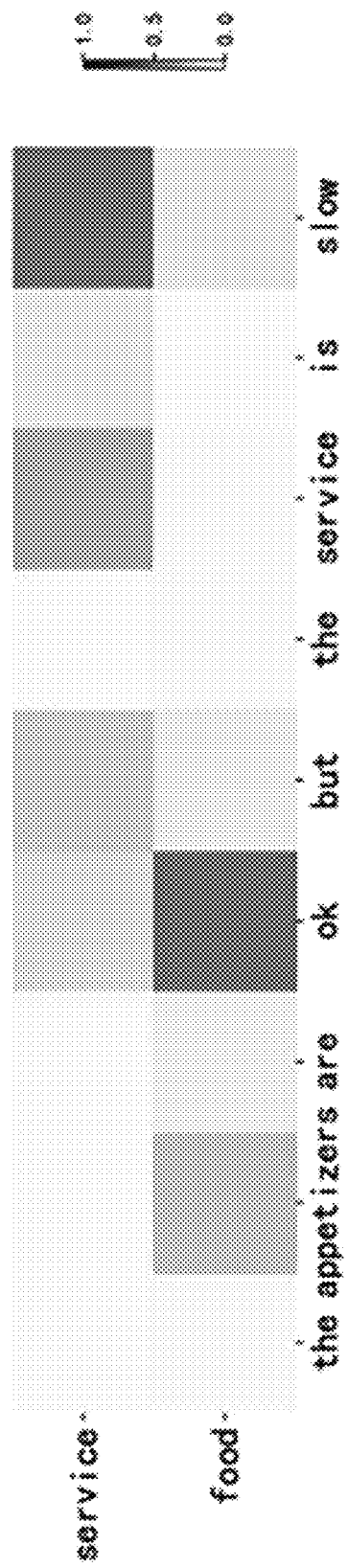
FIG. 9 is a schematic flowchart of predicting the degree of correlation of sentiment polarity of an information processing method according to an example embodiment of the disclosure.

In the embodiments of the disclosure, ATSA is used for analyzing the sentiment polarity of a term food, and ACSA is used for analyzing the sentiment polarity of a term service. The service and food in the target word feature vector have a high correlation with the source data (between 0 and 1), as shown in FIG. 9. Based on the above-mentioned sentiment polarity prediction, it may be learned that the service (sub-data "service") is negative, and the food (sub-data "appetizers") is positive, that is, the probability closer to 1 is the sentiment probability of sentiment polarity prediction.

An information processing method provided in an embodiment of the disclosure is verified below with experimental data.

As shown in Table 1, information processing based on different structures is performed on datasets R-big$_{category}$, $R_{category}$, $R_{term}$, and $L_{term}$. $R\text{-big}_{category}$ is a dataset of restaurant comment dataset about predefined categories in three years from 2014 to 2016; $R_{category}$ is a dataset of restaurant comment dataset about predefined categories in 2014; $L_{term}$ is a laptop comment dataset about a certain term in 2014; and $R_{term}$ is a restaurant comment dataset about a certain term in 2014. Each dataset includes DS and HDS. DS is an ordinary dataset; and HDS is sentences including only multi-sentiment polarities. In Table 1, the accuracy (the numbers in Table 1 represent accuracy) of processing the foregoing datasets in the related art is significantly lower than the accuracy of the information processing method provided in the embodiments of the disclosure.

TABLE 1

|  | $R\text{-big}_{category}$ | | $R_{category}$ | | $R_{term}$ | | $L_{term}$ | |
| --- | --- | --- | --- | --- | --- | --- | --- | --- |
| Model | DS | HDS | DS | HDS | DS | HDS | DS | HDS |
| Related Art | 86.75 | 68.46 | 80.90 | 53.93 | 78.41 | 55.92 | 70.21 | 46.48 |
| Method of the Disclosure | 87.55 | 75.73 | 81.78 | 62.02 | 78.85 | 60.33 | 71.50 | 51.30 |

Furthermore, in the embodiments of the disclosure, the server may use only the A-GRU, or use both the A-GRU and the T-GRU for information processing simultaneously. Based on this, the analysis of the accuracy of different processing modes is shown in Table 2.

TABLE 2

| | Model | | | | | | | | | |
| --- | --- | --- | --- | --- | --- | --- | --- | --- | --- | --- |
| | A-GRU | T-GRU | GRU | $R\text{-big}_{category}$ | | $R_{category}$ | | $R_{term}$ | | $L_{term}$ | |
| | | | | DS | HDS | DS | HDS | DS | HDS | DS | HDS |
| Related Art | √ | × | × | 86.75 | 68.46 | 80.90 | 53.93 | 78.41 | 55.92 | 70.21 | 46.48 |
| Method of the Disclosure | × | × | √ | 87.54 | 72.39 | 81.74 | 56.63 | 78.36 | 56.24 | 71.07 | 47.59 |
| | × | √ | × | 87.68 | 74.44 | 81.95 | 60.67 | 78.55 | 60.08 | 71.38 | 50.74 |
| | × | √ | √ | 87.34 | 75.30 | 81.91 | 61.12 | 78.59 | 60.16 | 71.47 | 51.11 |
| | √ | √ | √ | 87.55 | 75.73 | 81.78 | 62.02 | 78.85 | 60.33 | 71.50 | 51.30 |

The related technology is to use only the accuracy of the GRU as the values in the first row (among five rows of numbers representing accuracy). In an aspect of the disclosure, only the accuracy of the T-GRU may be used as the values in the second row. In an aspect of the disclosure, only the accuracy of the A-GRU may be used as the values in the third row. In an aspect of the disclosure, both the accuracy of the A-GRU and the accuracy of the T-GRU are used as the values in the fourth row. In an aspect of the disclosure, the accuracy of the A-GRU and the accuracy of the T-GRU are used in combination with the accuracy of processing of the GRU as the values in the fifth row. The comparison of the accuracy values in the five rows shows that the information processing method provided in the disclosure has the best effect.

Figure 10:
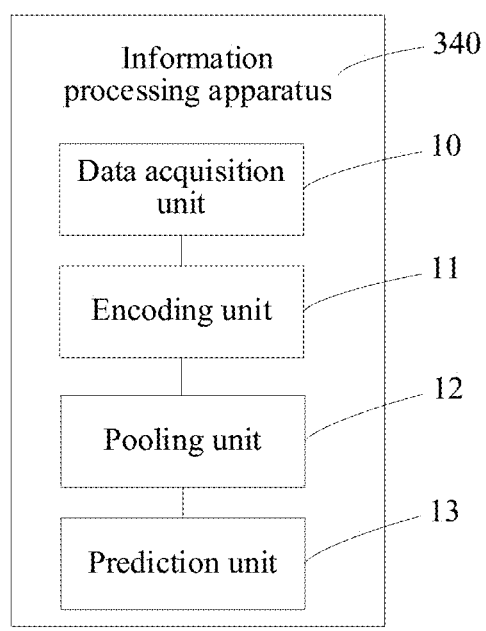
FIG. 10 is a schematic structural diagram of an information processing apparatus according to an example embodiment of the disclosure.

The following illustrates example structures of software modules. In some embodiments, as shown in FIG. 10, the software modules in an information processing apparatus 340 may include: a data acquisition unit 10, an encoding unit 11, a pooling unit 12, and a prediction unit 13.

The data acquisition unit 10 is configured to obtain source data.

The encoding unit 11 is configured to encode sub-data in the source data based on a target word feature vector to obtain hidden feature vectors corresponding to the sub-data. The target word feature vector represents a sentiment feature standard.

The pooling unit 12 is configured to obtain a word feature vector corresponding to the source data based on the hidden feature vectors corresponding to the sub-data.

The prediction unit 13 is configured to input the word feature vector into a preset sentiment classification network for prediction to obtain a sentiment polarity prediction result of the source data.

In some embodiments of the disclosure, the encoding unit 11 is further configured to encode the sub-data in the source data based on the target word feature vector and a preset gated nonlinear transformation model to obtain sub-feature vectors corresponding to the sub-data. The preset gated nonlinear transformation model is configured to perform nonlinear transformation on the sub-data to select a sub-feature vector that meets the target word feature vector. The sub-feature vector corresponding to each piece of sub-data is determined as a hidden feature vector corresponding to each piece of sub-data.

In some embodiments of the disclosure, the encoding unit 11 is further configured to perform, after encoding the sub-data in the source data based on the target word feature vector and the preset gated nonlinear transformation model to obtain the sub-feature vectors corresponding to the sub-data, feature transformation encoding of a preset depth level on the sub-data in the source data based on the sub-feature vectors corresponding to the sub-data and a preset feature transformation model to obtain the hidden feature vector corresponding to each piece of sub-data. The feature transformation encoding of the preset depth level is used for enhancing a sentiment feature.

In some embodiments of the disclosure, when the sub-data in the source data is represented by a $t^{th}$ piece of sub-data, where t is greater than or equal to 1 and less than or equal to N, and N is the total number of pieces of the sub-data in the source data, the encoding unit 11 is further configured to: when t is not 1, obtain a $(t-1)^{th}$ forward hidden feature vector in the source data; and encode the $t^{th}$ piece of sub-data based on the $(t-1)^{th}$ forward hidden feature vector, the target word feature vector, and the preset gated nonlinear transformation model to obtain a $t^{th}$ forward hidden feature vector corresponding to the $t^{th}$ piece of sub-data, and continue to encode a $(t+1)^{th}$ piece of sub-data until an $N^{th}$ forward hidden feature vector of an $N^{th}$ piece of sub-data is obtained; or when t is 1, encode a first piece of sub-data based on the target word feature vector and the preset gated nonlinear transformation model to obtain a first forward hidden feature vector corresponding to the first piece of sub-data; and determine the first forward hidden feature vector to the $N^{th}$ forward hidden feature vector as the sub-feature vectors corresponding to the sub-data.

In some embodiments of the disclosure, the encoding unit 11 is further configured to: when t is not N, obtain a $(t+1)^{th}$ reverse hidden feature vector in the source data; and encode the $t^{th}$ piece of sub-data based on the $(t+1)^{th}$ reverse hidden feature vector, the target word feature vector, and the preset gated nonlinear transformation model to obtain a $t^{th}$ reverse hidden feature vector corresponding to the $t^{th}$ piece of sub-data, and continue to encode the $(t-1)^{th}$ piece of sub-data until a first reverse hidden feature vector of the first piece of sub-data is obtained; or when t is N, encode the $t^{th}$ piece of sub-data based on the target word feature vector and the preset gated nonlinear transformation model to obtain the $t^{th}$ reverse hidden feature vector corresponding to the $t^{th}$ piece of sub-data; and respectively splice the first forward hidden feature vector to the $N^{th}$ forward hidden feature vector and the first reverse hidden feature vector to the $N^{th}$ reverse hidden feature vector in a one-to-one correspondence, to obtain a first sub-feature vector to an $N^{th}$ sub-feature vector, and determine the first sub-feature vector to the $N^{th}$ sub-feature vector as the sub-feature vectors corresponding to the sub-data.

In some embodiments of the disclosure, when the sub-data in the source data is represented by the $t^{th}$ piece of sub-data, where t is greater than or equal to 1 and less than or equal to N, and N is the total number of pieces of the sub-data in the source data, the encoding unit 11 is further configured to perform, when the preset depth level is an L level, for a first level of a $t^{th}$ sub-feature vector, first feature transformation encoding on the $t^{th}$ sub-feature vector according to the preset feature transformation model to obtain a first-level hidden feature vector, L being a positive integer greater than 1; or for a $j^{th}$ level of the $t^{th}$ sub-feature vector, obtain a $(j-1)^t$-level hidden feature vector of the $t^{th}$ sub-feature vector, the $(j-1)^t$-level hidden feature vector being obtained by performing $(j-1)^{th}$ feature transformation encoding on the $t^{th}$ sub-feature vector, and j being greater than 1 and less than L; perform $j^{th}$ feature transformation encoding on the $t^{th}$ sub-feature vector according to the $(j-1)^{th}$-level hidden feature vector and the preset feature transformation model to obtain a $j^{th}$-level hidden feature vector, and continue to perform $(j+1)^{th}$ feature transformation encoding on the $t^{th}$ sub-feature vector until an $L^{th}$-level hidden feature vector is obtained; and determine the $L^{th}$-level hidden feature vector as a hidden feature vector corresponding to the $t^{th}$ piece of sub-data.

In some embodiments of the disclosure, the pooling unit 12 is further configured to determine a maximum hidden feature vector from the hidden feature vectors corresponding to the sub-data; and determine the maximum hidden feature vector as the word feature vector.

In some embodiments of the disclosure, the pooling unit 12 is further configured to perform, after determining the maximum hidden feature vector from the hidden feature vectors corresponding to the sub-data, correlation processing on the maximum hidden feature vector and the target word feature vector to obtain the word feature vector.

In some embodiments of the disclosure, the prediction unit 13 is further configured to: input the word feature vector into the preset sentiment classification network for prediction to obtain a sentiment polarity probability set of the source data; determine a target sentiment polarity corresponding to a maximum sentiment polarity probability in the sentiment polarity probability set according to a correspondence between a preset probability and a sentiment polarity; and determine the target sentiment polarity as a sentiment polarity prediction result.

In some embodiments of the disclosure, the encoding unit 11 is further configured to: encode the sub-data in the source data through a deep transition encoder based on the target word feature vector to obtain the hidden feature vectors corresponding to the sub-data, the deep transition encoder including a sentiment-related gated unit, or including the sentiment-related gated unit cascaded with a transition gated unit of a preset depth level.

The pooling unit 12 is further configured to obtain the word feature vector corresponding to the source data in a maximum pooling layer based on the hidden feature vectors corresponding to the sub-data. An input of the maximum pooling layer is connected to the deep transition encoder, and an output of the maximum pooling layer is connected to the preset sentiment classification network.

In some embodiments of the disclosure, the deep transition encoder, the maximum pooling layer, and the preset sentiment classification network constitute a preset sentiment classification model. The software modules in the information processing apparatus 340 may further include an obtaining unit, a training unit, and an adjustment unit.

The obtaining unit is configured to obtain a training sample pair that includes sample source data and a sample actual sentiment polarity.

The training unit is configured to continuously train an initial sentiment classification model by using the sample source data to obtain a sentiment polarity training result.

The adjustment unit is configured to adjust model parameters of the initial sentiment classification model based on the sentiment polarity training result and the sample actual sentiment polarity to determine the preset sentiment classification model that meets a preset sentiment-related condition.

In some embodiments of the disclosure, the preset sentiment-related condition includes a preset sentiment polarity result condition and a preset sentiment feature condition.

The preset sentiment polarity result condition represents that a difference between the sentiment polarity training result and the sample actual sentiment polarity is less than a first preset threshold. The preset sentiment feature condition represents that a difference between a sample word feature vector corresponding to the sample source data and the target word feature vector is less than a second preset threshold.

In some embodiments of the disclosure, the adjustment unit is further configured to adjust, when the sentiment polarity training result and the sample actual sentiment polarity do not meet the preset sentiment-related condition, the model parameters of the initial sentiment classification model to obtain an intermediate sentiment classification model, and use the intermediate sentiment classification model to continue training until the preset sentiment classification model that meets the preset sentiment-related condition is obtained.

In an example in which the information processing method provided in the embodiments of the disclosure is implemented by software, the information processing method provided in this embodiments of the disclosure may be directly executed by using the processor 310 in the form of a hardware decoding processor, for example, one or more application-specific integrated circuit (ASICs), DSPs, PLDs, complex programmable logic devices (CPLDs), field-programmable gate array (FPGAs), or other electronic elements, to execute the information processing method provided in the embodiments of the disclosure.

An embodiment of the disclosure provides a storage medium storing executable instructions. When the executable instructions are executed by a processor, the processor is caused to perform the information processing method provided in the embodiments of the disclosure, for example, the information processing method shown in FIG. 4 to FIG. 6.

In some embodiments, the storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the executable instructions may be in the form of a program, software, software modules, scripts, or codes, may be written in any form of programming languages (including compiled or interpreted languages, or declarative or procedural languages), and may be deployed in any form, including being deployed as an independent program or deployed as modules, components, subroutines, or other units suitable for use in a computing environment.

As an example, the executable instructions may but do not necessarily correspond to a file in a file system, and may be stored as a part of a file that saves other programs or data, for example, stored in one or more scripts in a Hyper Text Markup Language (HTML) document, stored in a single file dedicated to the program in question, or stored in multiple collaborative files (e.g., a file that stores one or more modules, subroutines or code parts).

As an example, the executable instructions may be deployed to be executed on one computing device, or on multiple computing devices located in one location, or alternatively, to be executed on multiple computing devices that are distributed in multiple locations and interconnected through a communication network.

The embodiments of the disclosure include at least the following beneficial effects.

In a processor of performing sentiment analysis on the source data, each piece of sub-data in the source data is directly encoded based on the target word feature vector so as to obtain a hidden feature vector corresponding to each piece of sub-data; and then, the word feature vector corresponding to the source data is obtained based on the hidden feature vector corresponding to each piece of sub-data, thereby predicting sentiment polarities through the word feature vector. Since the target word feature vector represents a sentiment feature standard, the sentiment feature standard is used for directly encoding the sub-data in the source data. That is, the sub-data is encoded under the guidance of the sentiment feature standard, which makes sentiment features of the source data more prominent, so that when word feature vectors with prominent sentiment features are used for sentiment prediction, the accuracy of the sentiment polarity prediction result is improved.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely embodiments of the disclosure and are not intended to limit the protection scope of the disclosure. Any modification, equivalent replacement, or improvement made without departing from the spirit and range of the disclosure shall fall within the protection scope of the disclosure.

What is claimed is:

1. An information processing method, performed by at least one processor of an information processing apparatus, comprising:
   with respect to source data, encoding sub-data in the source data based on a target word feature vector to obtain hidden feature vectors corresponding to the sub-data, the target word feature vector representing a sentiment feature standard;
   obtaining a word feature vector corresponding to the source data based on the hidden feature vectors corresponding to the sub-data; and
   inputting the word feature vector into a preset sentiment classification network to obtain a result of sentiment polarity prediction of the source data,
   wherein the sub-data in the source data comprises a plurality of pieces of the sub-data, and the encoding the sub-data comprises, except for a piece of the sub-data that is encoded first:
   encoding each piece of the sub-data based on the target word feature vector, a preset gated nonlinear transformation model, and a hidden feature vector, which is obtained by encoding a previous piece of sub-data, the preset gated nonlinear transformation model being configured to perform nonlinear transformation on a corresponding piece of the sub-data to select a sub-feature vector that meets the target word feature vector.

2. The method according to claim 1, wherein the encoding the sub-data further comprises:
   encoding the plurality of pieces of the sub-data to obtain sub-feature vectors corresponding to the sub-data; and
   determining the sub-feature vectors corresponding to the sub-data as the hidden feature vectors corresponding to the sub-data.

3. The method according to claim 2, wherein the determining the sub-feature vectors corresponding to the sub-data as the hidden feature vectors corresponding to the sub-data comprises:

performing feature transformation encoding of a preset depth level on the sub-data in the source data based on the sub-feature vectors corresponding to the sub-data and a preset feature transformation model to obtain the hidden feature vectors corresponding to the sub-data, the feature transformation encoding of the preset depth level being used for enhancing a sentiment feature.

4. The method according to claim 3, wherein the sub-data in the source data is represented by a tth piece of the sub-data, t being greater than or equal to 1 and less than or equal to N, and N being a total number of pieces of the sub-data in the source data, and the preset depth level is an L level, L being a positive integer greater than 1, and the performing the feature transformation encoding comprises:

for a first level of a tth sub-feature vector, performing first feature transformation encoding on the tth sub-feature vector according to the preset feature transformation model to obtain a first-level hidden feature vector;

for a jth level of the tth sub-feature vector, obtaining a (j−1)th-level hidden feature vector of the tth sub-feature vector, the (j−1)th-level hidden feature vector being obtained by performing (j−1)th feature transformation encoding on the tth sub-feature vector, and j being greater than 1 and less than L;

performing jth feature transformation encoding on the tth sub-feature vector according to the (j−1)th-level hidden feature vector and the preset feature transformation model to obtain a jth-level hidden feature vector, and performing (j+1)th feature transformation encoding on the tth sub-feature vector until an Lth-level hidden feature vector is obtained; and determining the Lth-level hidden feature vector as a hidden feature vector corresponding to the tth piece of the sub-data.

5. The method according to claim 2, wherein the sub-data in the source data is represented by a tth piece of the sub-data, t being greater than or equal to 1 and less than or equal to N, and N being a total number of pieces of the sub-data in the source data, and the encoding the sub-data in the source data based on the target word feature vector and the preset gated nonlinear transformation model comprises:

based on t being not 1, obtaining a (t−1)th forward hidden feature vector in the source data; encoding the tth piece of the sub-data based on the (t−1)th forward hidden feature vector, the target word feature vector, and the preset gated nonlinear transformation model, to obtain a tth forward hidden feature vector corresponding to the tth piece of the sub-data; and encoding a (t+1)th piece of the sub-data until an Nth forward hidden feature vector of an Nth piece of the sub-data is obtained; or based on t being 1, encoding a first piece of the sub-data based on the target word feature vector and the preset gated nonlinear transformation model, to obtain a first forward hidden feature vector corresponding to the first piece of the sub-data, the first forward hidden feature vector to the Nth forward hidden feature vector being the sub-feature vectors corresponding to the sub-data.

6. The method according to claim 5, further comprising:
based on t not being N, obtaining a (t+1)th reverse hidden feature vector in the source data; encoding the tth piece of the sub-data based on the (t+1)th reverse hidden feature vector, the target word feature vector, and the preset gated nonlinear transformation model, to obtain a tth reverse hidden feature vector corresponding to the tth piece of the sub-data; and encoding the (t−1)th piece of the sub-data until a first reverse hidden feature vector of the first piece of the sub-data is obtained; or t being N, encoding the tth piece of the sub-data based on the target word feature vector and the preset gated nonlinear transformation model, to obtain the tth reverse hidden feature vector corresponding to the tth piece of the sub-data, the method further comprising:

respectively splicing the first forward hidden feature vector to the Nth forward hidden feature vector and the first reverse hidden feature vector to an Nth reverse hidden feature vector in a one-to-one correspondence, to obtain a first sub-feature vector to an Nth sub-feature vector; and determining the first sub-feature vector to the Nth sub-feature vector as the sub-feature vectors corresponding to the sub-data.

7. The method according to claim 1, wherein the obtaining the word feature vector comprises:

determining a maximum hidden feature vector from the hidden feature vectors corresponding to the sub-data; and determining the maximum hidden feature vector as the word feature vector.

8. The method according to claim 7, further comprising:
performing correlation processing on the maximum hidden feature vector and the target word feature vector to obtain the word feature vector.

9. The method according to claim 1, wherein the inputting the word feature vector into the preset sentiment classification network comprises:

inputting the word feature vector into the preset sentiment classification network to obtain a sentiment polarity probability set of the source data; and determining, as the result of sentiment polarity prediction, a target sentiment polarity corresponding to a maximum sentiment polarity probability in the sentiment polarity probability set according to a correspondence between a preset probability and a sentiment polarity.

10. The method according to claim 1, wherein the encoding the sub-data comprises:

encoding the sub-data in the source data through a deep transition encoder based on the target word feature vector to obtain the hidden feature vectors corresponding to the sub-data, the deep transition encoder including a sentiment-related gated unit, or including the sentiment-related gated unit cascaded with a transition gated unit of a preset depth level; and the obtaining the word feature vector comprises:

obtaining the word feature vector corresponding to the source data in a maximum pooling layer based on the hidden feature vectors corresponding to the sub-data, an input of the maximum pooling layer being connected to the deep transition encoder, and an output of the maximum pooling layer being connected to the preset sentiment classification network.

11. The method according to claim 10, wherein the deep transition encoder, the maximum pooling layer and the preset sentiment classification network constitute a preset sentiment classification model, and the method further comprises:

obtaining a training sample pair that comprises sample source data and a sample actual sentiment polarity;

training an initial sentiment classification model by using the sample source data to obtain a sentiment polarity training result; and adjusting model parameters of the initial sentiment classification model based on the sentiment polarity training result and the sample actual sentiment polarity to determine the preset sentiment classification model that meets a preset sentiment-related condition.

12. The method according to claim 11, wherein
the preset sentiment-related condition comprises a preset sentiment polarity result condition and a preset sentiment feature condition,
the preset sentiment polarity result condition being a condition that a difference between the sentiment polarity training result and the sample actual sentiment polarity is less than a first preset threshold, and the preset sentiment feature condition being a condition that a difference between a sample word feature vector corresponding to the sample source data and the target word feature vector is less than a second preset threshold.

13. The method according to claim 11, wherein the adjusting the model parameters comprises:
based on the sentiment polarity training result and the sample actual sentiment polarity not meeting the preset sentiment-related condition, adjusting the model parameters of the initial sentiment classification model to obtain an intermediate sentiment classification model, and training the intermediate sentiment classification model until the preset sentiment-related condition is met.

14. The information processing apparatus, comprising:
a memory, configured to store executable instructions; and
a processor, configured to perform the method according to claim 1 during execution of the executable instructions stored in the memory.

15. An information processing apparatus, comprising:
at least one memory configured to store program code; and
at least one processor configured to read the program code and operate as instructed by the program code, the program code comprising:
encoding code configured to cause at least one of the at least one processor to, with respect to source data, encode sub-data in the source data based on a target word feature vector to obtain hidden feature vectors corresponding to the sub-data, the target word feature vector representing a sentiment feature standard;
pooling code configured to cause at least one of the at least one processor to obtain a word feature vector corresponding to the source data based on the hidden feature vectors corresponding to the sub-data; and
prediction code configured to cause at least one of the at least one processor to input the word feature vector into a preset sentiment classification network to obtain a result of sentiment polarity prediction of the source data,
wherein the sub-data in the source data comprises a plurality of pieces of the sub-data, and the the encoding code configured to cause at least one of the at least one processor to, except for a piece of the sub-data that is encoded first:
encode each piece of the sub-data based on the target word feature vector, a preset gated nonlinear transformation model, and a hidden feature vector, which is obtained by encoding a previous piece of sub-data, the preset gated nonlinear transformation model being configured to perform nonlinear transformation on a corresponding piece of the sub-data to select a sub-feature vector that meets the target word feature vector.

16. The apparatus according to claim 15, wherein the encoding code comprises:
first encoding sub-code configured to cause at least one of the at least one processor to encode the plurality of pieces of the sub-data to obtain sub-feature vectors corresponding to the sub-data; and
determining sub-code configured to cause at least one of the at least one processor to determine the sub-feature vectors corresponding to the sub-data as the hidden feature vectors corresponding to the sub-data.

17. The apparatus according to claim 16, wherein the determining sub-code is further configured to cause at least one of the at least one processor to perform feature transformation encoding of a preset depth level on the sub-data in the source data based on the sub-feature vectors corresponding to the sub-data and a preset feature transformation model to obtain the hidden feature vectors corresponding to the sub-data, the feature transformation encoding of the preset depth level being used for enhancing a sentiment feature.

18. The apparatus according to claim 16, wherein the sub-data in the source data is represented by a tth piece of the sub-data, t being greater than or equal to 1 and less than or equal to N, and N being a total number of pieces of the sub-data in the source data, and
the first encoding sub-code is further configured to cause at least one of the at least one processor to:
based on t being not 1, obtain a (t−1)th forward hidden feature vector in the source data; encode the tth piece of the sub-data based on the (t−1)th forward hidden feature vector, the target word feature vector, and the preset gated nonlinear transformation model, to obtain a tth forward hidden feature vector corresponding to the tth piece of the sub-data; and encode a (t+1)th piece of the sub-data until an Nth forward hidden feature vector of an Nth piece of the sub-data is obtained; or
based on t being 1, encode a first piece of the sub-data based on the target word feature vector and the preset gated nonlinear transformation model, to obtain a first forward hidden feature vector corresponding to the first piece of the sub-data,
the first forward hidden feature vector to the Nth forward hidden feature vector being the sub-feature vectors corresponding to the sub-data.

19. The apparatus according to claim 18, wherein the encoding code further comprises second encoding sub-code configured to cause at least one of the at least one processor to:
based on t not being N, obtain a (t+1)th reverse hidden feature vector in the source data; encode the tth piece of the sub-data based on the (t+1)th reverse hidden feature vector, the target word feature vector, and the preset gated nonlinear transformation model, to obtain a tth reverse hidden feature vector corresponding to the tth piece of the sub-data; and encode the (t−1)th piece of the sub-data until a first reverse hidden feature vector of the first piece of the sub-data is obtained; or
t being N, encode the tth piece of the sub-data based on the target word feature vector and the preset gated nonlinear transformation model, to obtain the tth reverse hidden feature vector corresponding to the tth piece of the sub-data,
the encoding code further comprises:
splicing sub-code configured to cause at least one of the at least one processor to respectively splice the first forward hidden feature vector to the Nth forward hidden feature vector and the first reverse hidden feature vector to an Nth reverse hidden feature vector in a one-to-one correspondence, to obtain a first sub-feature vector to an Nth sub-feature vector; and determine the first sub-feature vector to the Nth sub-feature vector as the sub-feature vectors corresponding to the sub-data.

20. A non-transitory computer-readable storage medium, storing instructions executable by at least one processor to perform:

with respect to source data, encoding sub-data in the source data based on a target word feature vector to obtain hidden feature vectors corresponding to the sub-data, the target word feature vector representing a sentiment feature standard;

obtaining a word feature vector corresponding to the source data based on the hidden feature vectors corresponding to the sub-data; and inputting the word feature vector into a preset sentiment classification network to obtain a result of sentiment polarity prediction of the source data, wherein the sub-data in the source data comprises a plurality of pieces of the sub-data, and the encoding the sub-data comprises, except for a piece of the sub-data that is encoded first:

encoding each piece of the sub-data based on the target word feature vector, a preset gated nonlinear transformation model, and a hidden feature vector, which is obtained by encoding a previous piece of sub-data, the preset gated nonlinear transformation model being configured to perform nonlinear transformation on a corresponding piece of the sub-data to select a sub-feature vector that meets the target word feature vector.

* * * * *